UNITED STATES PATENT OFFICE.

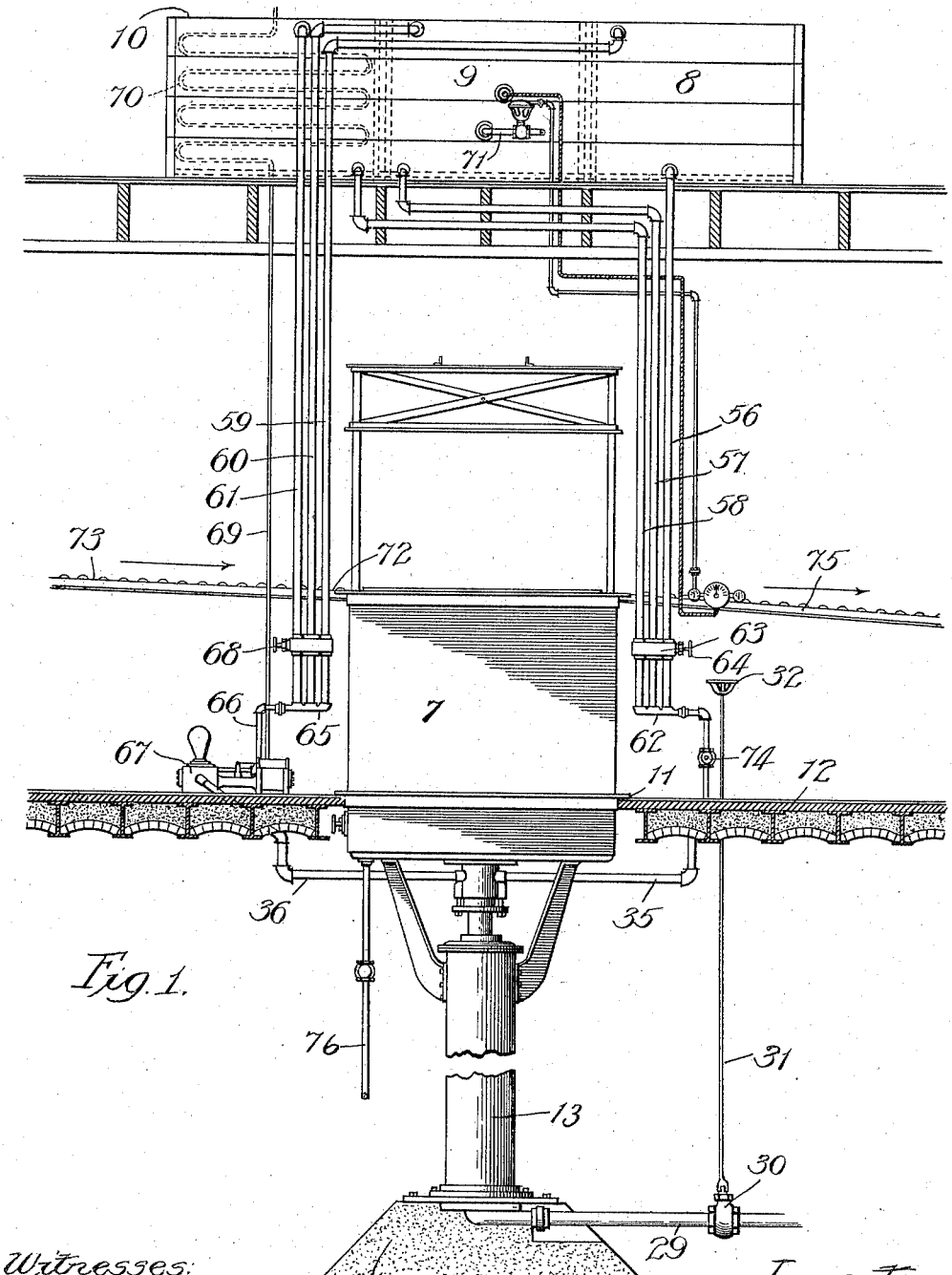

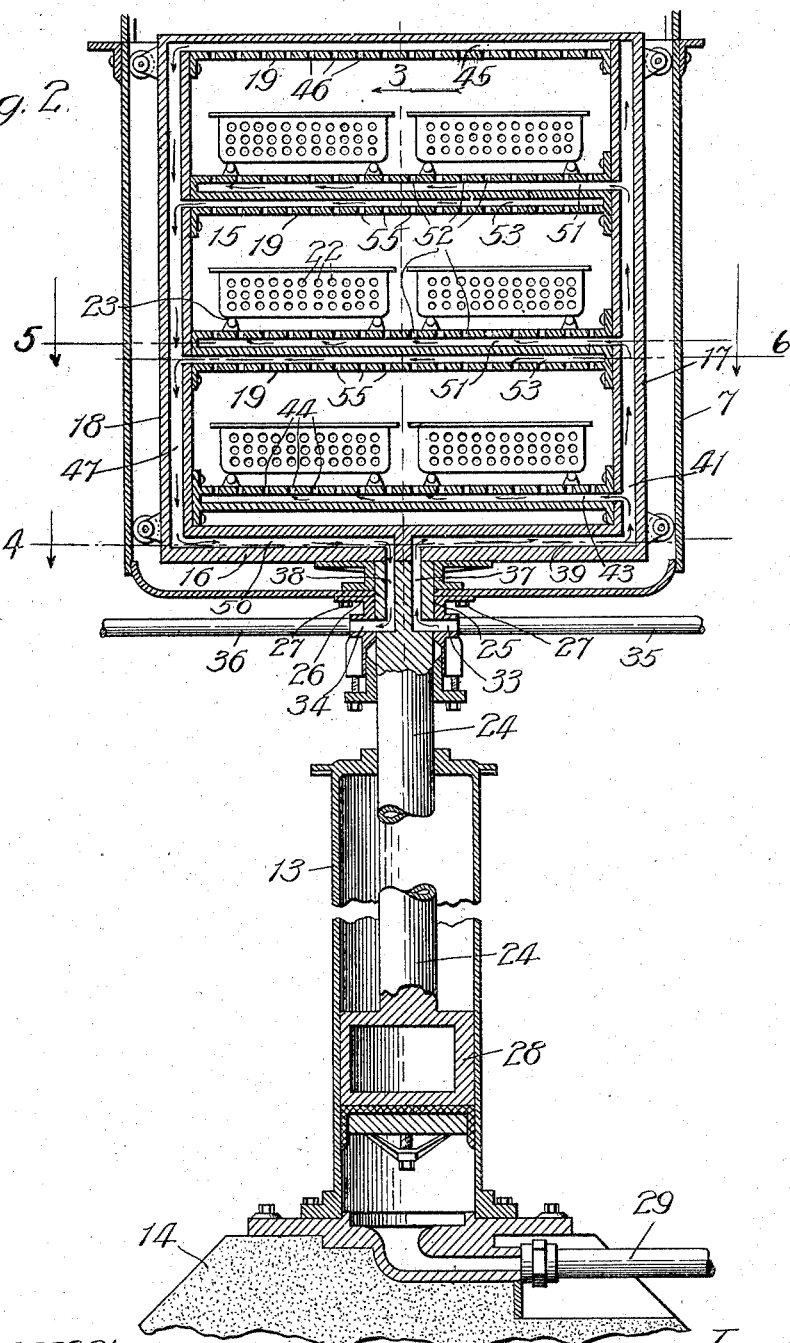

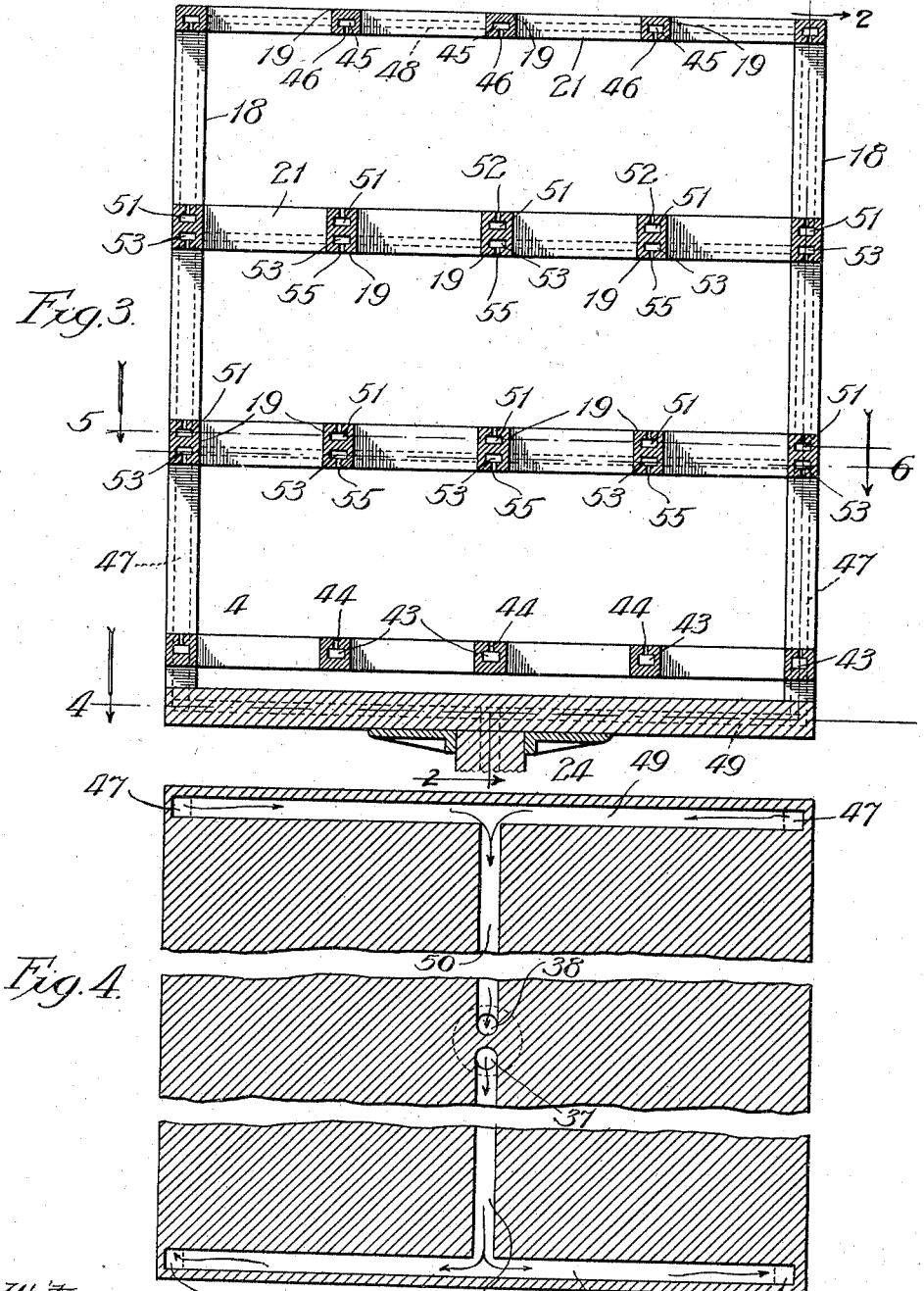

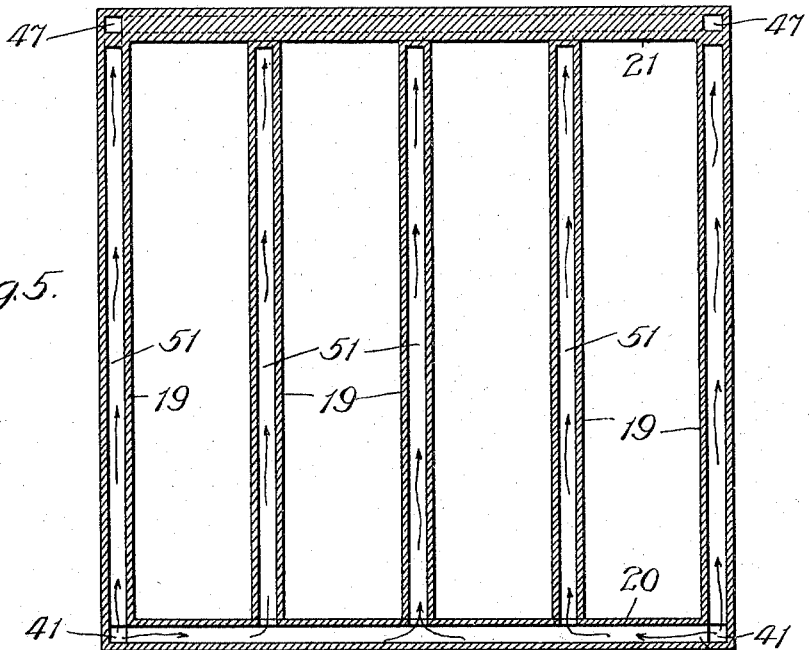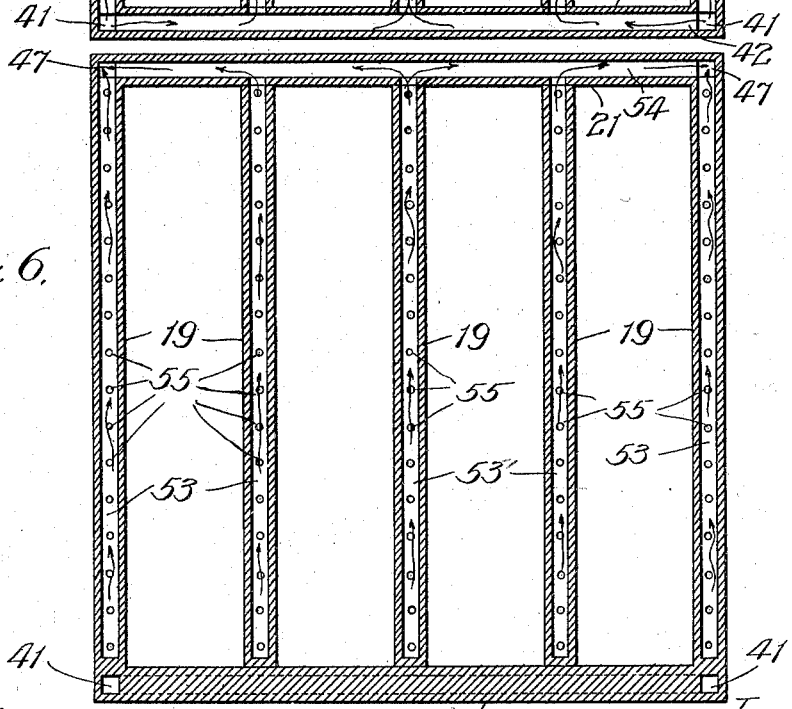

AUGUST TIESSE, OF CHICAGO, ILLINOIS.

PASTEURIZING APPARATUS.

966,872.  Specification of Letters Patent.  Patented Aug. 9, 1910.

Application filed January 19, 1910. Serial No. 538,918.

*To all whom it may concern:*

Be it known that I, AUGUST TIESSE, a citizen of the United States, residing at Chicago, in the county of Cook and State of Illinois, have invented a new and useful Improvement in Pasteurizing Apparatus, of which the following is a specification.

My objects, generally stated, are to provide improvements in pasteurizing apparatus to the end of effecting uniform pasteurization; of conducting the pasteurizing operation with economy of heat and water; and augmenting the circulation of water in the pasteurizing tank without interfering with the introduction therein, and the removal therefrom, of the supports for the trays or crates for the receptacles containing the material to be pasteurized.

Referring to the accompanying drawings—Figure 1 shows by a view in elevation pasteurizing apparatus constructed in accordance with my invention. Fig. 2 is a broken view in sectional elevation of the pasteurizing tank and carrier therein and means for operating the carrier, the section being taken at the irregular line 2 on Fig. 3 and viewed in the direction of the arrow, the section through the base of the carrier and those parts below said base being in central elevation, and those parts above said base being taken through one side thereof, namely at the rear of the carrier. Fig. 3 is an enlarged section taken at the line 3 on Fig. 2 and viewed in the direction of the arrow with the surrounding tank omitted. Fig. 4 is a broken section taken at the line 4 on Fig. 3 and the line 4 on Fig. 2 and viewed in the direction of the arrows. Fig. 5 is a section taken at the line 5 on Fig. 3 and the line 5 on Fig. 2 and viewed in the direction of the arrows; and Fig. 6, a section taken at the line 6 on Fig. 3 and the line 6 on Fig. 2 and viewed in the direction of the arrows.

In the construction in which I have chosen to illustrate my invention, I employ a single tank represented at 7 in which the pasteurizing operations are performed, this tank coöperating with three water-storage tanks 8, 9 and 10 in a manner hereinafter described, for circulating through the tank 7 the water for pre-heating, pasteurizing and cooling the material to be pasteurized.

The tank 7 is represented as supported in an opening 11 in a floor 12 on a vertically-disposed cylinder 13 resting on a foundation 14. The tank 7, which, in the construction shown, is of rectangular shape in cross-section, contains a carrier 15 for trays, crates or other form of supports for bottles, or the like, carrying the material to be pasteurized, this carrier being of rectangular shape and preferably formed of a platform, or base, 16, upright members 17 and 18 rising from the corners thereof and located, respectively, on the right and left-hand side of the carrier as viewed in Fig. 2, a plurality of superposed series of cross-beams, said series being spaced apart vertically and the beams of each series being spaced apart horizontally as represented in Figs. 2 and 5, the beams 19 being connected with the uprights 17 and 18 and with beams 20 and 21 arranged on the right and left-hand sides respectively of the carrier as viewed in Fig. 2, the beams 20 and 21 being connected at their opposite ends with the uprights 17 and 18 and disposed at right-angles to the cross-beams 19 as most clearly represented of the beams 21 in Fig. 3. The cross-beams 19 of each series form spaced supports for trays, crates, platforms, baskets, or any other suitable device, preferably perforated or of open-work construction, as for instance those represented at 22, for carrying the receptacles containing the material to be pasteurized and insertible into the carrier through its open sides, rollers 23 being provided on the cross-members 19 for facilitating the introduction into and the removal from the carrier of the trays, and preventing obstruction to the circulation of water in the tank produced as hereinafter described.

The carrier 15, by preference, is carried on the end of a piston-rod 24, which extends through an opening 25 in the bottom of the tank and is reciprocally confined in a bearing 26 secured to the tank 7, as by bolts 27, this rod being connected with a piston 28 in the cylinder 13. The cylinder 13 is connected at its lower end with a pipe 29 which is equipped with a three-way valve 30 of common construction controllable through the medium of a rod 31 provided with a hand-valve 32 for operating it, the pipe 29 communicating with a water-supply (not shown) under pressure for operating the piston by hydraulic power for raising and lowering the carrier 15 in the tank 7, as hereinafter more fully explained.

The bearing 26 contains in its opposite sides non-communicating passages 33 and 34 which communicate at their outer ends with pipes 35 and 36 respectively, and, when the piston 24 and carrier 13 are in the positions illustrated in Fig. 2, communicate at their inner ends with non-communicating passages, or conduits, 37 and 38, respectively, in the upper end of the piston-rod 24. The conduit 37 communicates with a horizontal conduit 39 in the base 16 of the carrier, the latter conduit extending to the right in Fig. 2 and opening into the center of a cross-conduit 40 in the base 16. The cross-conduit 40 opens at its ends into vertical conduits 41 formed in the uprights 17, these vertical conduits opening into horizontal conduits 42 in the beams 20 arranged as described at different levels and at the right-hand side of Fig. 2. Each cross-member 19 of the lowermost series thereof contains a horizontal conduit 43 closed at one end as represented in Fig. 2, wherein it is shown closed at its left-hand end and opening into the conduits 41 and 42 as represented of one of the beams 19 in Fig. 2, the upper wall of the conduits 43 of each series of beams 19 being perforated as indicated at 44, whereby water introduced into the conduits in the frame-members of the carrier 15, as hereinafter described, flows upwardly from these perforations into the tank 7. The cross-members 19 of the uppermost series thereof each contain a horizontally and longitudinally extending conduit 45 having its bottom wall perforated as indicated at 46 in Fig. 2, each of said conduits being closed at one end as indicated in Fig. 2 of the one therein illustrated, and opening into vertical conduits 47 in the two uprights 18 at the left-hand side of the carrier in Fig. 2, and into a conduit 48 in the uppermost one of the beams 21, the upright conduits 47 communicating with a horizontal conduit 49 in the base 16, this latter conduit opening into a conduit 50 in the base at right-angles to the conduit 49 and communicating with the conduits 38 in the piston-rod 24.

The cross-beams 19 of the intermediate series thereof each contain a horizontally-extending conduit 51 opening into the conduits 41 in the uprights 17 and the conduits 42 in the adjacent beams 20, the upper walls of the conduits 51 being perforated as indicated at 52. The cross-beams 19 of each intermediate series thereof, in addition to containing the conduits 51, contain conduits 53 which open into the vertical conduits 47 and into conduits 54 formed in the beams 21 disposed opposite to the intermediate series of beams 19, the conduits 54 opening into the vertical conduits 47, and the lower walls of the conduits 53 being perforated as indicated at 55.

In the operation of the apparatus, it is intended that water at the desired temperatures for effecting the pasteurization of the material be circulated through the various conduits in the piston-rod 24, in the carrier 15 as described, and through the tank 7, the water being introduced into this system of conduits through the pipe 35 and withdrawn therefrom through the pipe 36. As an economical way of supplying the water to the tank for pasteurization, I provide the following described apparatus, which contemplates the use of the storage tanks 8, 9 and 10 for water at different temperatures, the flow of water from these tanks through the tank 7 being controllable.

In the particular apparatus illustrated, the tanks 8, 9 and 10 are connected at their lower ends with pipes 56, 57 and 58, respectively, and at their upper ends with pipes 59, 60 and 61, respectively. The pipes 56, 57 and 58 open into a header 62 which is connected with the pipe 35, the pipes 56, 57 and 58 being valve-controlled for permitting any one of these pipes to be brought into communication with the pipe 35, as by the valve illustrated at 63, this valve being the common three-plug variety formed with a single operating wheel 64, whereby communication of any one of the various pipes controlled thereby with the pipe 35 may be established. The pipes 59, 60 and 61 open into a header 65, which, in the particular arrangement illustrated, is connected by means of a pipe 66 with the outlet-end of a force pump illustrated at 67 and driven in any suitable manner, the pump communicating at its inlet-end with the pipe 36. Communication of the pipes 59, 60 and 61 with the header 65 is controlled by any suitable means as by the valve-mechanism represented at 68, these valve-means being of the same variety as those indicated at 63 and operating, when actuated, to cause any one of the pipes 59, 60 and 61 to be brought into communication with the pipe 66, and consequently with the pipe 36.

The operation of the apparatus is as follows: Water is supplied to tanks 7 and 8 at about normal temperature, say 65° F., and water maintained in the tanks 10 and 9 at about 212° F. and pasteurizing temperature, respectively, the latter varying with the material to be pasteurized, some materials requiring a greater temperature than others for pasteurization. The water in the tanks 9 and 10 is maintained at the desired temperatures in any suitable manner, as by exhaust steam or live steam, in the apparatus illustrated the tank 10 being heated by the exhaust from the engine 67 which discharges through a pipe 69 terminating in a coil 70 in the tank 10, and the tank 9 by live steam introduced therein through a pipe 71. Assuming the carrier 15 and the hydraulic mechanism therefor to be in the position illustrated in Fig. 2, the operator to load the carrier, assuming it to be empty, turns the valve 32 to permit water, under pressure, to flow into the cylinder 13 below the piston 28, thus forcing the carrier 15 upward in the tank to a position in which its lowermost series of cross-bars 19 register with the discharge-end 72 of a platform 73, shown as a rotary conveyer, from which the trays, crates or platforms 22 supporting the receptacles, such as bottles containing the material to be pasteurized, are discharged into the lowermost compartment of the carrier upon the rollers 23 supported on the bars 19.

After the lowermost compartment of the carrier, bounded by the lowermost series of cross-beams 19 and the series thereof immediately above them, is filled, the operator by again operating the valve to permit a portion of the water to exhaust from the cylinder through the exhaust of the three-way valve, causes the carrier to descend into the tank to a position in which the next to the lowermost series of cross-beams 19 alines with the conveyer 73, whereupon the compartment of the carrier of which these beams form the open floor is filled, the alternate operations of lowering the carrier in the tank and charging it at different levels with the trays 22 continuing until the carrier is filled with the material to be pasteurized, whereupon the carrier is allowed to assume the position represented in Fig. 2 in which all of the crates 22 are lowered into the tank. The operator then turns the valves 62 and 68 to cause the pipes 56 and 59 to communicate with the pipes 35 and 36, respectively, whereupon the water from the tank 8 flows through the pipes 56 and 35, conduits 33 and 37, the conduit 39, the vertical conduits 41, and conduits 42 from which it flows into the conduits 43 and 51 in the cross-beams 19 and out through the perforations 44 and 52 into the tank 7 at different levels therein. Under the action of the pump 67, suction is produced in the pipe 36, rod-conduit 38, platform-conduit 50, conduits 49 and 47, the conduits 54 in the beams 21, and in the conduits 45 and 53 in the cross-beams 19, with the result of drawing water from the tank 7 through the perforations 46 and 55, respectively, at different levels, thus causing the water to circulate through tanks 7 and 8. Where beer is being pasteurized, communication of the tank 7 with tank 8 is maintained as described until the temperature of the water in these tanks is equalized, which may be ascertained in any desired manner, as is well understood in the art. The beer being introduced into the tank at about 40° to 50° F. is thus warmed by the operation described, and the water in the tanks 7 and 8 cooled to equal temperatures. After the receptacles in the crates 22 have been pre-heated as described, the operator again manipulates the valves 63 and 68 to disconnect the pipes 56 and 59 and open the pipes 58 and 61 to the pipes 35 and 36, respectively, thus placing tank 10 in circuit with tank 7. The water in tank 10, which is hotter than that at which pasteurization takes place, is caused to circulate through tank 7 as described of the first operation, until the water in tank 7 has reached the desired pasteurizing temperature, which may be determined by any suitable way, as is well understood in the art, whereupon the operator again manipulates these valves to disconnect the tank 10 from the tank 7 and open the pipes 57 and 60 to the pipes 35 and 36, respectively, for circulating water through tank 7 at the desired pasteurizing temperature. The last referred to operation continues until the pasteurization of the material in the receptacles carried by the trays 22 is completed, whereupon the tank 7 is again brought into communication with the tank 8 by manipulating the valves 63 and 68 for cooling the receptacles and their contents before removing them from the pasteurizing tanks. The water in tank 8 having been cooled by the action of subjecting it to the cold beer when first treated to water in tank 7, cools the receptacles and their contents, and as soon as the temperature of the water in tanks 7 and 8 is equalized the operator turns a valve 74 in the pipe 35 for closing it to prevent further flow of water to the tank 37. The trays 22 are now ready to be removed from the carrier 15, this being effected by raising the piston 28 hydraulically as described, to cause the floors of the various compartments of the carrier formed by the conduit-equipped beams 19, to be successively brought into alinement with the receiving end of a discharge-conveyer 75 upon which the crates 22 are discharged.

The series of operations described, namely those of successively charging the carrier with the trays of receptacles containing the material to be pasteurized, lowering the carrier into the tank and therein subjecting the material to water at different temperatures, and finally raising the carrier to permit of the discharge therefrom of the material pasteurized, are repeated with each separate batch of material to be pasteurized. It will be noted that where the material to be pasteurized is introduced into the carrier 15 at a relatively lower temperature, as in the case of beer, the water in tank 8 in the operation of pre-heating the material is cooled, and thus after this pre-heating operation this water is in cooled condition for cooling the material after subjection to pasteurizing heat, as described; and that in such cooling operation the water in this tank is heated, placing it in a highly satisfactory condition for pre-heating the material introduced in cold condition into the carrier, these operations of heating and cooling the water in tank 8 being performed in a cycle, whereby the heating and cooling power of the material being pasteurized is utilized to a full degree.

From the foregoing description, it will be noted that the water is both introduced and withdrawn from the tank 7 at different levels, and as this tank is filled at all times with water, the effect of thus introducing and withdrawing the water is to produce highly effective circulation thereof throughout the tank. Furthermore, by introducing the water into the tank at different levels and below the crates or trays 22, the receptacles in each crate 22 are subjected to water at the same degree of temperature, and thus there is uniformity of pasteurization with respect to all of the material being operated on.

In the construction illustrated, the rod 24 in coöperating with the bearing 26 forms, in effect, a pair of valves, which in the position illustrated in Fig. 2 are open to cause the conduits 33 and 34 to have free communication with the conduits 37 and 38, respectively, but when moved from such position to elevate the carrier in the tank, are operated to automatically shut off the flow of water into and out of tank 7. It is desirable that the tank 7 be provided with a drain-pipe, such as that represented at 76 for draining the tank when desired.

By providing a single tank in which the pasteurizing operations are performed, and providing a series of tanks for storing water at different temperatures for introduction into the pasteurizing tank, the pasteurizing operation may be carried on without the loss of water and without wasting heat, as the water at the various temperatures may be used over and over again.

The feature of forming the carrier of conduit-equipped members, whereby water is both introduced and withdrawn from the pasteurizing tank at different levels, is of great advantage, as it permits of the maximum utilization of the space afforded in the tank, as the water-distributing conduits are movable with the carrier.

While I prefer to embody my invention in the apparatus illustrated, it will be understood that the construction may be variously modified and varied without departing from the spirit of my invention, and furthermore my invention may be embodied in a carrier used in connection with any system for supplying water to the tank with which it coöperates, instead of using the system of tanks hereinbefore described. It will also be manifest that while my improved system of water-supply is particularly useful in connection with my improved carrier as the combined advantages of these features afford a highly practical and commercial machine, the water system described is useful in connection with any other forms of carriers, where it is desirable that economy be practiced in the amount of water and heat used for performing the pasteurizing operations. It will furthermore be understood that when the receptacles containing the material to be pasteurized are of such a character that pre-heating and cooling thereof before and after subjection to the pasteurizing temperature, respectively, is unnecessary, the tanks 8 and 10 may be dispensed with and tank 9 alone employed, the employment of my improved carrier in connection with either a single or a plurality of water-supply tanks, as hereinbefore referred to, being within the spirit of my invention, and therefore no undue limitations are to be placed upon the illustration and description of a particular construction.

It will be manifest that in so far as the feature of providing the carrier with water-conduits is concerned, such conduits need not be formed in the frame-members of the carrier, but may be provided in any other suitable manner.

What I claim as new, and desire to secure by Letters Patent, is—

1. A pasteurizing apparatus comprising, in combination, a tank, means in the tank for supporting receptacles containing the material to be pasteurized, means for introducing water for pasteurization into said tank, and means for simultaneously and continuously withdrawing the water therefrom at different levels, for the purpose set forth.

2. A pasteurizing apparatus comprising, in combination, a tank, means in the tank for supporting receptacles containing the material to be pasteurized, means for introducing water for pasteurization into said tank, and means located above said receptacles for simultaneously and continuously withdrawing the water from the tank at different levels therein, for the purpose set forth.

3. A pasteurizing apparatus comprising, in combination, a tank, means in the tank for supporting receptacles containing the material to be pasteurized, means for simultaneously introducing the water for pasteurization into the tank at different levels, and means for withdrawing the water therefrom at different levels, for the purpose set forth.

4. A pasteurizing apparatus comprising, in combination, a tank, means in the tank for supporting receptacles containing the material to be pasteurized, means for introducing water for pasteurization into said tank at different levels therein below said receptacles, and means for withdrawing the water therefrom at different levels in the tank above said receptacles, for the purpose set forth.

5. A pasteurizing apparatus comprising, in combination, a tank, means in the tank for supporting receptacles containing the material to be pasteurized in superposed condition, means for introducing water for pasteurization into said tank below each horizontal series of receptacles, and means for withdrawing the water therefrom above each series of receptacles, for the purpose set forth.

6. A pasteurizing apparatus comprising, in combination, a tank, means in the tank for supporting receptacles containing the material to be pasteurized in superposed condition, means for introducing water for pasteurization into said tank at different levels and intermediate adjacent series of receptacles, and means for simultaneously withdrawing the water from said tank intermediate adjacent series of receptacles.

7. A pasteurizing apparatus comprising, in combination, a tank, means in the tank for supporting receptacles containing the material to be pasteurized in superposed condition, a water-inlet pipe in said tank below each series of receptacles, and a water-outlet pipe in said tank above each series of receptacles, for the purpose set forth.

8. A pasteurizing apparatus comprising, in combination, a tank, a vertically-movable support in the tank for receptacles containing the material to be pasteurized, said support being equipped with conduits for introducing the water into the tank, and means for withdrawing the water therefrom, said conduits being adapted to be connected with a source of water-supply, for the purpose set forth.

9. A pasteurizing apparatus comprising, in combination, a tank, a support in the tank constructed and arranged to support receptacles containing the material to be pasteurized in superposed condition, said support being equipped with conduits for introducing the water into the tank at different levels therein, and means for withdrawing the water from the tank, said conduits being adapted to be connected with a source of water-supply, for the purpose set forth.

10. A pasteurizing apparatus comprising, in combination, a tank, a support in the tank for receptacles containing the material to be pasteurized, said support being equipped with outlet-pipes through which the water in the tank is withdrawn, and means for introducing water into the tank, for the purpose set forth.

11. A pasteurizing apparatus comprising, in combination, a tank, and a support in the tank for receptacles containing the material to be pasteurized, said support being equipped with conduits for introducing the water into the tank and withdrawing it therefrom, said conduits being adapted to be connected with a source of water-supply, for the purpose set forth.

12. A pasteurizing apparatus comprising, in combination, a tank, and a support in the tank for receptacles containing the material to be pasteurized, said support being equipped with conduits for introducing the water into the tank and withdrawing it therefrom, and said conduits being adapted to be connected in circuit with a source of water-supply, for the purpose set forth.

13. A pasteurizing apparatus comprising, in combination, a tank, and a support in the tank constructed and arranged to support receptacles containing the material to be pasteurized in superposed condition, said support being equipped with conduits above and below each series of receptacles for introducing the water into the tank and withdrawing it therefrom, said inlet-conduits being adapted to be connected with a source of water-supply, for the purpose set forth.

14. A pasteurizing apparatus comprising in combination a tank, and a carrier vertically movable in said tank for supporting receptacles containing the material to be pasteurized, said carrier being equipped with conduits for introducing the water into said tank and withdrawing it therefrom, and said inlet-conduits being adapted to be connected with a source of water-supply, for the purpose set forth.

15. A pasteurizing apparatus comprising, in combination, a tank, and a carrier vertically movable in said tank for supporting receptacles for the material to be pasteurized in superposed condition, said carrier being equipped with conduits for introducing the water into the tank and withdrawing it therefrom below and above said superposed receptacles, said inlet-conduits being adapted to be connected with a source of water-supply, for the purpose set forth.

16. A pasteurizing apparatus comprising, in combination, a tank, and a support in said tank for supporting receptacles containing the material to be pasteurized in superposed condition, said support being equipped with conduits for introducing water into the tank and withdrawing it therefrom at different levels in the tank, said inlet-conduits being adapted to be connected with a source of water-supply and opening upwardly, and said outlet-conduits opening downwardly, for the purpose set forth.

17. A carrier, for the purpose set forth, formed with a vertical series of skeleton supports for receptacles containing the material to be pasteurized, said carrier being equipped with a conduit adapted to be connected with a source of water-supply.

18. A carrier, for the purpose set forth, formed with a skeleton support for receptacles containing the material to be pasteurized, said carrier being equipped with inlet and outlet conduits above and below said receptacles, for the purpose set forth.

19. A carrier, for the purpose set forth, provided with a vertical series of supports for receptacles containing the material to be pasteurized, formed of spaced cross-members equipped with conduits, for the purpose set forth.

20. A carrier, for the purpose set forth, provided with a vertical series of supports for receptacles containing material to be pasteurized, formed of spaced members equipped with inlet-conduits below the receptacles of each series and with outlet conduits above each series of receptacles, for the purpose set forth.

21. A carrier, for the purpose set forth, formed with uprights and with spaced members connected with said uprights in a vertical series and affording supports for receptacles containing the material to be pasteurized, said uprights and said spaced members being equipped with conduits, certain of the conduits in said spaced members being connected with the conduits in certain of the uprights, and the other of the conduits in said spaced members being connected with the conduits in the other of said uprights, for the purpose set forth.

22. A carrier, for the purpose set forth, formed with skeleton supports for receptacles containing the material to be pasteurized, said carrier being equipped with vertically-disposed inlet and outlet-conduits and said supports being provided with inlet and outlet conduits arranged at different levels and communicating with said vertical conduits, for the purpose set forth.

23. A carrier, for the purpose set forth, provided at different levels with spaced beams affording supports for receptacles containing the material to be pasteurized, uprights, and beams connecting said uprights, said spaced beams, uprights and said last-named beams being connected together and provided with conduits, the conduits in certain of said uprights, spaced-beams and said last-named beams being connected together to afford inlet-conduits, and the conduits of the other of said uprights, spaced-beams and said last-named beams communicating with each other and forming outlet-conduits, for the purpose set forth.

24. A pasteurizing apparatus comprising, in combination, a tank, a vertically movable carrier in said tank for supporting receptacles containing the material to be pasteurized, a bearing on the tank, a vertically reciprocable member slidable in said bearing and coöperating with the carrier to raise and lower the latter when said member is actuated, said carrier being equipped with conduits for introducing water into said tank and withdrawing it therefrom communicating with conduits in said member, and said bearing containing inlet and outlet conduits constructed and arranged to register with conduits in said member when the latter is in one position and to be out of registration therewith when said member is moved out of such position, for the purpose set forth.

25. A pasteurizing apparatus comprising, in combination, a tank, a vertically movable carrier in the tank for supporting receptacles containing the material to be pasteurized, a bearing on the tank, and a vertically movable member reciprocable in said bearing and coöperating with said carrier to raise and lower the latter when said member is actuated, said carrier containing conduits for introducing water into the tank and withdrawing it therefrom, and said bearing containing inlet and outlet conduits, said member being constructed and arranged to open communication between the conduits of said carrier and the conduits in said bearing when in one position and close said communication when in another position, for the purpose set forth.

26. A pasteurizing apparatus comprising, in combination, a tank, a vertically movable carrier in said tank for supporting receptacles containing the material to be pasteurized, a bearing on said tank, a vertically movable member reciprocable in said bearing and coöperating with said carrier to raise and lower the latter when said member is actuated and provided near its upper end with non-communicating conduits, said bearing containing inlet and outlet conduits adapted, when said member is in one position, to register respectively with the conduits in said member, and said carrier being equipped with non-communicating conduits registering respectively with the conduits in said member, and further provided with upright conduits and horizontal conduits opening into said tank at different levels therein and constructed and arranged to circulate in the tank the water introduced therein, for the purpose set forth.

27. A pasteurizing apparatus comprising, in combination, a tank containing means for supporting receptacles containing the material to be pasteurized, a plurality of water-storage tanks containing water at different temperatures, and means for controlling the flow of water from said storage-tanks into said first-named tank, for the purpose set forth.

28. A pasteurizing apparatus comprising, in combination, a tank, a vertically movable carrier in said tank for supporting receptacles containing the material to be pasteurized, and a plurality of water-storage tanks in which water is adapted to be maintained at different temperatures coöperating with said first-named tank, for the purpose set forth.

29. In pasteurizing apparatus, the combination of a tank containing means for supporting receptacles containing the material to be pasteurized, a plurality of water-storage tanks containing water at different temperatures provided near their bottom-portions with outlets and near their upper ends with inlets, pipes connecting said inlets and outlets with said first-named tank, and means for controlling the flow of water from said plurality of tanks to said first-named tank, to cause the water in any one of said plurality of tanks to enter said first-named tank, for the purpose set forth.

30. A pasteurizing apparatus comprising, in combination, a tank containing means for supporting receptacles containing material to be pasteurized, a plurality of water-storage tanks containing water at different temperatures and each provided with an inlet and an outlet, pipes connecting said inlets and outlets with said first-named tank, means for controlling the flow of water from said plurality of tanks to said first-named tank, to cause any one of said plurality of tanks to be placed in circuit with said first-named tank, and means for producing circulation of the water from any one of said water-storage tanks through said first-named tank when in communication therewith, for the purpose set forth.

31. A pasteurizing apparatus comprising, in combination, a tank containing means for supporting receptacles containing material to be pasteurized, a plurality of water-storage tanks containing water at different temperatures and each provided with an inlet and an outlet pipe, a pair of single pipes connected with said first-named tank and forming the inlets and outlets thereof, one of said pair of pipes being connected with the outlet pipes of said plurality of tanks, and the other of said pair of pipes being connected with the inlet-pipes of said plurality of tanks, and valve-mechanisms in the inlet and outlet pipes of said plurality of tanks for controlling the communication thereof with said pair of pipes to cause water to circulate through said first-named tank and any one of said plurality of tanks, for the purpose set forth.

32. In pasteurizing apparatus, the combination of a tank, a vertically movable carrier in the tank for supporting receptacles containing the material to be pasteurized, means for moving said carrier in the tank, and means for introducing water into the tank controllable automatically by the raising and lowering of said carrier, for the purpose set forth.

33. In pasteurizing apparatus, the combination of a tank, a vertically movable carrier in the tank for supporting receptacles containing material to be pasteurized, means for moving said carrier in the tank, and means for introducing water into the tank and withdrawing it therefrom controllable automatically by the movement of said carrier-moving means.

34. In pasteurizing apparatus, the combination of a tank, a vertically movable carrier in the tank for supporting receptacles containing the material to be pasteurized, a bearing on the tank, a vertical reciprocable member slidable in said bearing and coöperating with the carrier to raise and lower the latter when said member is actuated, said carrier being equipped with a conduit for introducing water into said tank communicating with a conduit in said member, and said bearing containing an inlet-conduit constructed and arranged to register with the conduit in said member when the latter is in one position and to be out of registration therewith when said member is moved out of such position, for the purpose set forth.

AUGUST TIESSE.

In presence of—
  M. A. NYMAN,
  R. A. SCHAEFER.